(12) United States Patent
Vanderberg (10) Patent No.: US 10,899,525 B2
(45) Date of Patent: *Jan. 26, 2021

(54) COOLER WITH WRAP-AROUND SIDE COVER

(71) Applicant: M & C INNOVATIONS, LLC, Charlotte, NC (US)

(72) Inventor: Matthew Alexander Vanderberg, Charlotte, NC (US)

(73) Assignee: M & C INNOVATIONS, LLC, Charlotte, NC (US)

( * ) Notice: Subject to any disclaimer, the term of this patent is extended or adjusted under 35 U.S.C. 154(b) by 560 days.

This patent is subject to a terminal disclaimer.

(21) Appl. No.: 15/096,210

(22) Filed: Apr. 11, 2016

(65) Prior Publication Data
US 2016/0221741 A1    Aug. 4, 2016

Related U.S. Application Data

(63) Continuation of application No. 14/252,549, filed on Apr. 14, 2014, now Pat. No. 9,309,038, which is a continuation of application No. 13/526,487, filed on Jun. 18, 2012, now Pat. No. 8,695,839.

(60) Provisional application No. 61/498,342, filed on Jun. 17, 2011.

(51) Int. Cl.
*B65D 81/18*    (2006.01)
*A47J 41/00*    (2006.01)

(52) U.S. Cl.
CPC .......... *B65D 81/18* (2013.01); *A47J 41/0061* (2013.01); *A47J 41/0066* (2013.01); *Y10T 29/49826* (2015.01)

(58) Field of Classification Search
CPC .... B65D 81/18; A47J 41/0061; A47J 41/0066
USPC .............. 220/591.24, 9.4, 23.91, 694.1, 739, 220/592.03; 62/457.1, 457.7
See application file for complete search history.

(56) References Cited

U.S. PATENT DOCUMENTS

| | | | | |
|---|---|---|---|---|
| 2,725,087 A * | 11/1955 | Potter | ................... | B65D 88/522 108/55.1 |
| 3,396,885 A * | 8/1968 | Giondi Leona | ............ | B62J 7/00 220/9.1 |
| 5,169,025 A * | 12/1992 | Guo | ................... | B65D 81/3876 215/12.1 |
| 5,913,448 A * | 6/1999 | Mann | ................... | A45C 7/0063 220/666 |
| 6,145,696 A * | 11/2000 | Duncan | ................... | B65D 25/34 150/154 |
| 2001/0006083 A1 * | 7/2001 | Haberkorn | ................ | B60P 3/20 150/154 |

(Continued)

*Primary Examiner* — J. Gregory Pickett
*Assistant Examiner* — Niki M Eloshway
(74) *Attorney, Agent, or Firm* — Chad D Tillman; Jeremy C Doerre; Tillman Wright, PLLC (57) ABSTRACT

A cooler includes a cooler body including one or more cooler walls. The cooler further includes a cover configured to be disposed around an exterior of the cooler body, the cover being sized and dimensioned to generally cover an exterior of the one or more cooler walls of the cooler body. The cover preferably includes a moisture-absorbent material. The cover also preferably includes an image, logo, symbol, or text; or a panel preferably includes the image, logo, symbol, or text, which panel is removably attachable to the cover.

20 Claims, 7 Drawing Sheets

(56) References Cited

U.S. PATENT DOCUMENTS

| | | | | |
|---|---|---|---|---|
| 2002/0029992 A1* | 3/2002 | Purvis | ............... | B65D 81/3813 |
| | | | | 206/459.1 |
| 2002/0043076 A1* | 4/2002 | Hodosh | ................. | A45C 11/20 |
| | | | | 62/457.4 |
| 2003/0042264 A1* | 3/2003 | Stanwix | .................... | F25D 3/14 |
| | | | | 220/592.21 |
| 2007/0000932 A1* | 1/2007 | Cron | ................. | B65D 81/3897 |
| | | | | 220/592.24 |
| 2009/0293531 A1* | 12/2009 | Longua | ................. | B65D 25/34 |
| | | | | 62/457.2 |
| 2012/0217255 A1* | 8/2012 | Connelly | .......... | B65D 81/3879 |
| | | | | 220/592.24 |

\* cited by examiner

COOLER WITH WRAP-AROUND SIDE COVER

CROSS-REFERENCE TO RELATED APPLICATION

The present application is a U.S. continuation patent application of, and claims priority under 35 U.S.C. § 120 to, U.S. nonprovisional patent application Ser. No. 14/252,549, filed Apr. 14, 2014, which '549 application is a U.S. continuation patent application of, and claims priority under 35 U.S.C. § 120 to, U.S. nonprovisional patent application Ser. No. 13/526,487, filed Jun. 18, 2012, which patent application and any patent application publications thereof and patents issuing therefrom are hereby incorporated herein by reference, and which '487 application is a nonprovisional of, and claims priority under 35 U.S.C. § 119(e) to, U.S. provisional patent application Ser. No. 61/498,342, filed Jun. 17, 2011, which is hereby incorporated herein by reference. Additionally, the present application hereby incorporates by reference each of the following U.S. patents and U.S. patent application publications: U.S. Pat. Nos. 7,677,580; 7,387,305; 7,559,559; 7,543,828; 7,549,653; 7,458,589; 7,458,590; 7,458,591; 7,513,510; 7,677,581; US 2006/0237923 A1; US 2006/0237924 A1; US 2006/0237925 A1; US 2006/0237926 A1; US 2006/0237927 A1; US 2006/0237928 A1; US 2008/0223071 A1; US 2008/0223862 A1; US 2008/0223072 A1; US 2009/0019882 A1; US 2010/0154464 A1; US 2010/0147015; US 2011/0042390 A1; US 2011/0042391 A1; US 2011/0042392 A1; US 2011/0042393 A1; US 2011/0042394 A1; US 2011/0042395 A1; US 2011/0042396 A1; US 2011/0042397 A1; and US 2011/0042398 A1. Each of these patents and application publications is incorporated herein by reference for purposes of disclosing aspects, features, and embodiments that, when combined with one or more aspects or features of the present invention as disclosed below, constitute embodiments of the present invention. Thus the present invention, inter alia, comprises enhancements, improvements, and alterations of the embodiments of the incorporated references.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

Portable coolers have long been utilized to, inter alia, transport chilled items and keep items chilled at locations without other means of chilling. However, a need exists for improvement in portable coolers. This, and other needs, are addressed by one or more aspects of the present invention.

SUMMARY OF THE INVENTION

The present invention includes many aspects and features. Moreover, while many aspects and features relate to, and are described in, the context of collapsible coolers, the present invention is not limited to use only in this context, as will become apparent from the following summaries and detailed descriptions of aspects, features, and one or more embodiments of the present invention.

Accordingly, one aspect of the present invention relates to a cooler. The cooler includes a cooler body including one or more cooler walls; a cover configured to be disposed around an exterior of the cooler body, the cover being sized and dimensioned to generally cover an exterior of the one or more cooler walls of the cooler body; wherein the cover comprises a moisture-absorbent material.

In a feature of this aspect, the cover is flexible.

In a feature of this aspect, the cover is pliable.

In a feature of this aspect, the cover comprises neoprene.

In a feature of this aspect, the cover comprises polychloroprene.

In a feature of this aspect, the cover comprises one or more synthetic rubber materials.

In a feature of this aspect, the cover is secured to the cooler body.

In a feature of this aspect, the cover is secured to both a base of the cooler body and an upper rim of the cooler body.

In a feature of this aspect, the cover is secured to the cooler body via snap connectors.

In a feature of this aspect, the cover is a snug-fit cover. In some implementations, the cover is configured to be secured to the cooler body via a snug fit of the cover around the cooler body.

In a feature of this aspect, the cooler further includes a lid.

In a feature of this aspect, the cover includes one or more hinge lines configured for collapsing of the cover.

In a feature of this aspect, the cooler body includes one or more hinge lines configured to allow the cooler body to transition between an expanded configuration and a collapsed configuration; the cover includes one or more hinge lines configured to allow the cover to collapse; and the cooler body and the cover are configured such that, even when the cover is secured about the cooler body, the cooler body can transition between its expanded configuration and its collapsed configuration.

In a feature of this aspect, the cover comprises a continuous band.

In a feature of this aspect, the cover comprises a sheet configured to be secured to itself.

Another aspect of the present invention relates to a method for handling sweating at a cooler. The method includes disposing a cover about one or more exterior walls of the cooler. The cover comprises a moisture-absorbent material.

In a feature of this aspect, the method further includes a step of securing the cover to the cooler.

Another aspect of the present invention relates to a cover configured to be disposed around an exterior of a cooler, the cover comprising a moisture-absorbent material.

Another aspect of the present invention relates to a method for handling sweating of a cooler as disclosed.

Another aspect of the present invention relates to a method for handling sweating of a cooler.

Another aspect of the present invention relates to a method of using a cooler cover.

Another aspect of the present invention relates to a cooler cover as disclosed.

Another aspect of the present invention relates to a cooler comprising a cover as disclosed.

Another aspect of the present invention relates to a cooler cover configured to handle sweating as disclosed.

Another aspect of the present invention relates to a method for handling condensation on the outside of a cooler as disclosed.

Another aspect of the present invention relates to a cooler cover configured to handle condensation on the outside of a cooler as disclosed.

In addition to the aforementioned aspects and features of the present invention, it should be noted that the present invention further encompasses the various possible combinations and subcombinations of such aspects and features. Thus, for example, any aspect may be combined with an aforementioned feature in accordance with the present invention without requiring any other aspect or feature.

BRIEF DESCRIPTION OF THE DRAWINGS

One or more preferred embodiments of the present invention now will be described in detail with reference to the accompanying drawings, wherein the same elements are referred to with the same reference numerals, and wherein.

DETAILED DESCRIPTION

As a preliminary matter, it will readily be understood by one having ordinary skill in the relevant art ("Ordinary Artisan") that the present invention has broad utility and application. As should be understood, any embodiment may incorporate only one or a plurality of the above-disclosed aspects of the invention and may further incorporate only one or a plurality of the above-disclosed features. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its implementations, or uses.

Figure 1:
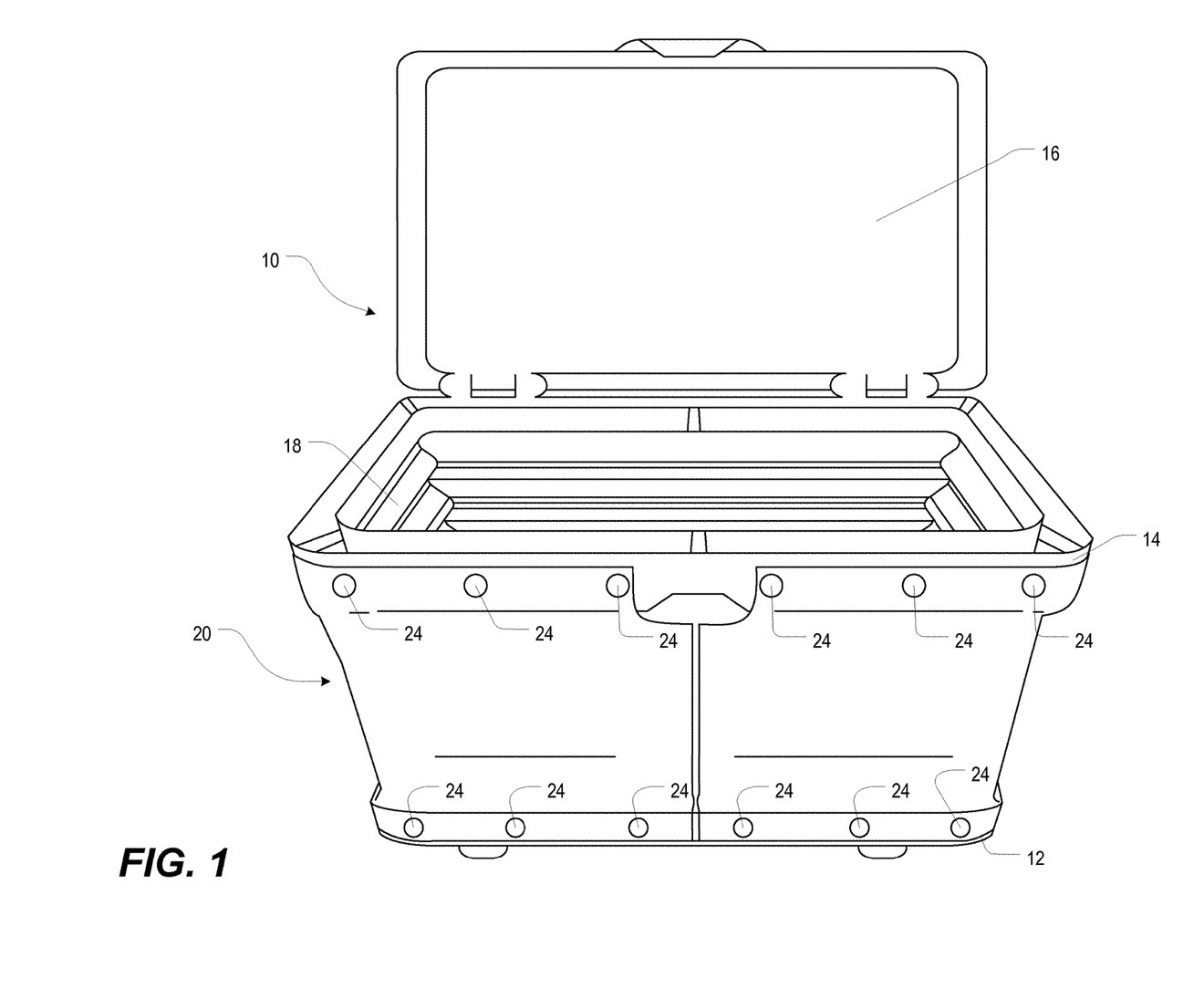
FIG. 1 is a front perspective view of a preferred embodiment of a cooler with wrap-around side cover in accordance with one or more aspects of the present invention.
Figure 2:
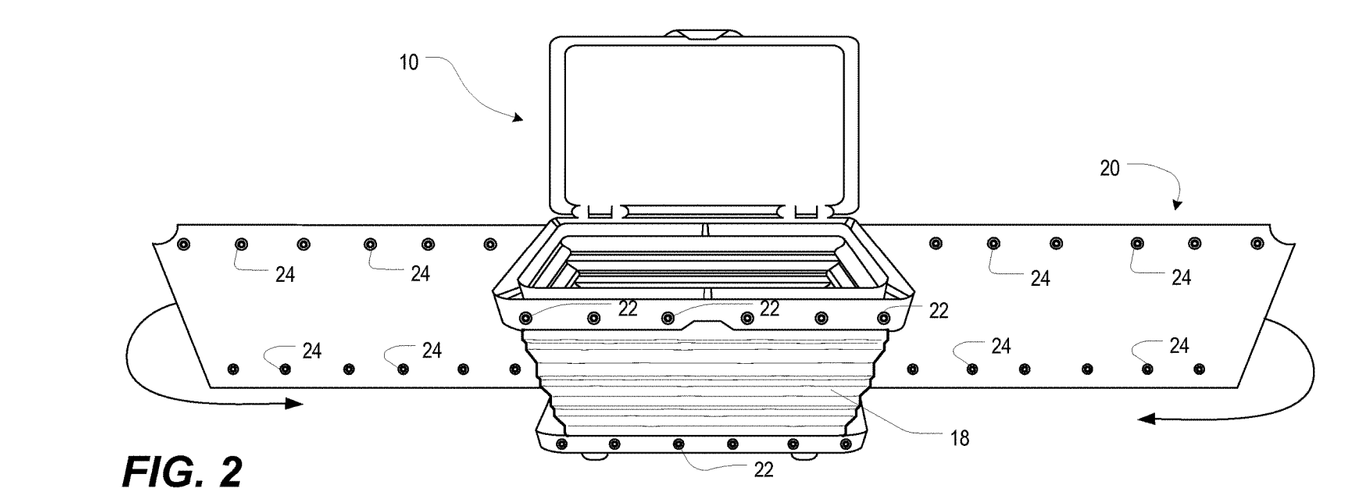
FIG. 2 is a front perspective view of the cooler with wrap-around side cover of FIG. 1 showing the wrap-around side cover detached from the cooler.
Figure 3:
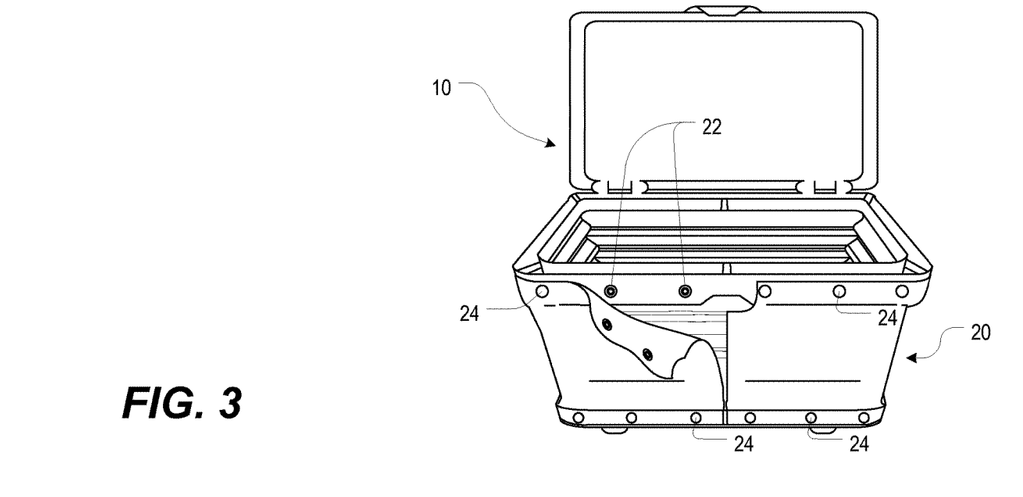
FIG. 3 is a front perspective view of the cooler with wrap-around side cover of FIG. 1 showing the wrap-around side cover partially detached from the cooler.

FIG. 1 is a front perspective view of a preferred embodiment of a rectangular cooler 10 with wrap-around side cover 20 in accordance with one or more aspects of the present invention. FIG. 2 is a front perspective view of the cooler 10 with a wrap-around side cover 20 of FIG. 1 showing the wrap-around side cover 20 detached from the cooler 10. FIG. 3 is a front perspective view of the cooler 10 with a wrap-around side cover 20 of FIG. 1 showing the wrap-around side cover 20 partially detached from the cooler 10. As illustrated in FIGS. 1-3, the cooler 10 comprises a base 12, an upper rim 14, a lid 16, and a cooler wall 18 extending between the base 12 and the upper rim 14. The base 12 and the upper rim 14 include a plurality of male snap connectors 22 adapted to mate with female snap connectors 24 on the wrap-around side cover 20. Although the cooler 10 and wrap-around side cover 20 are shown with snap connectors 22,24, alternative contemplated embodiments include other types of connectors to attach the wrap-around cover to the cooler.

In one or more preferred embodiments, the wrap-around side cover 20 is constructed from a flexible, elastic, moisture-absorbent material, such as neoprene, polychloroprene, or other synthetic rubber materials.

FIGS. 2 and 3 illustrate the process of attaching the wrap-around side cover 20 to the cooler 10. The wrap-around side cover 20 is positioned around the cooler wall 18, as seen in FIG. 2. Next, the female snap connectors 24 on the wrap-around side cover 20 are aligned with, and attached to, the male snap connectors 22 on the base 12 and upper rim 14, as illustrated in FIG. 3.

Figure 4:
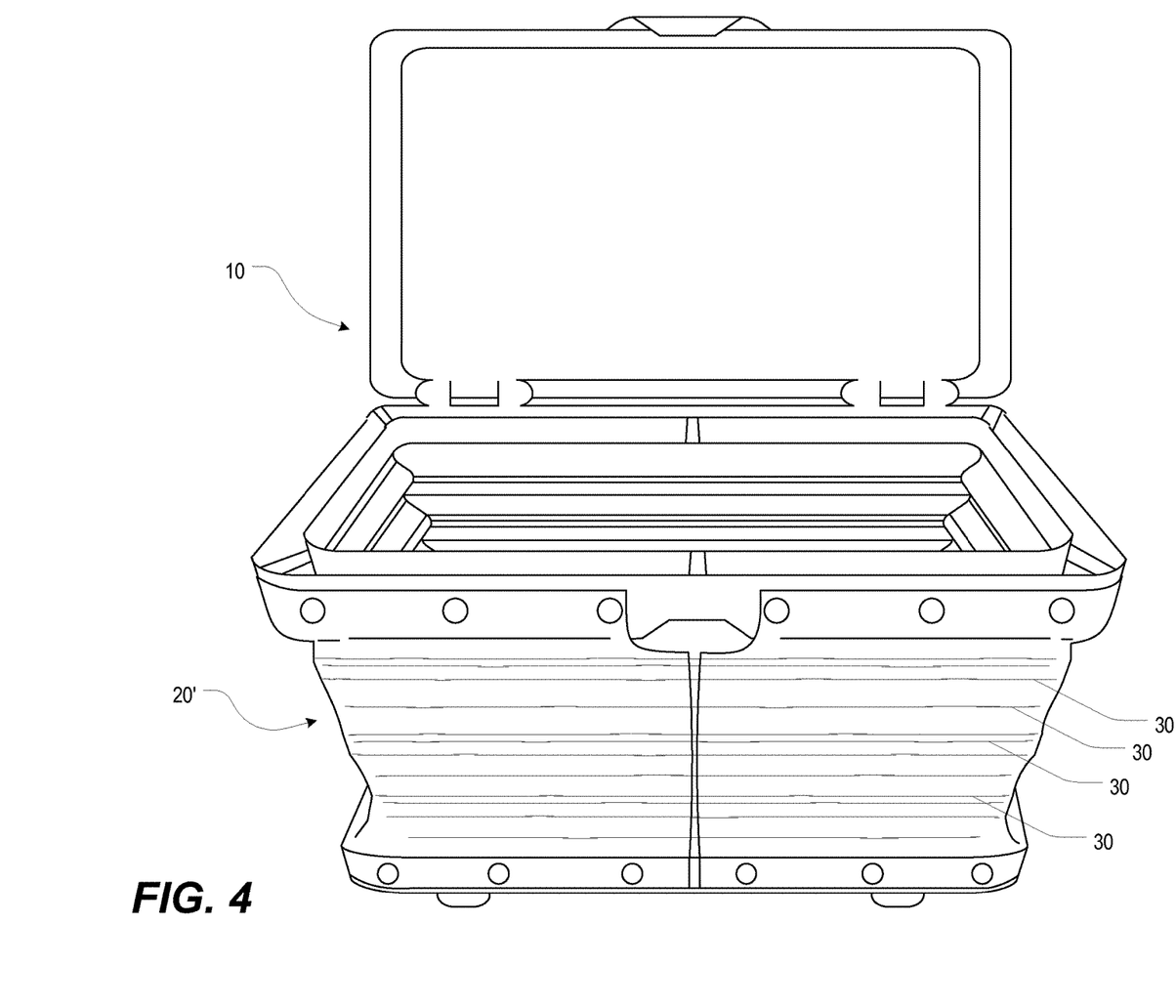
FIG. 4 is a front perspective view of a cooler of FIG. 1 with a snug-fit wrap-around side cover in accordance with one or more aspects of the present invention.

FIG. 4 is a front perspective view of the cooler 10 of FIG. 1 with a snug-fit wrap-around side cover 20' in accordance with one or more aspects of the present invention. The snug-fit wrap-around side cover 20' resembles the wrap-around side cover 20; however, the snug-fit wrap-around side cover 20' is adapted to fit more snuggly around the cooler wall 18. In one or more preferred embodiments, the snug-fit wrap-around side cover 20' includes one or more hinge lines 30. The hinge lines 30 are thinner, and thus more flexible and more deformable, than other portions of the snug-fit wrap-around cover 20'.

Figure 5A:
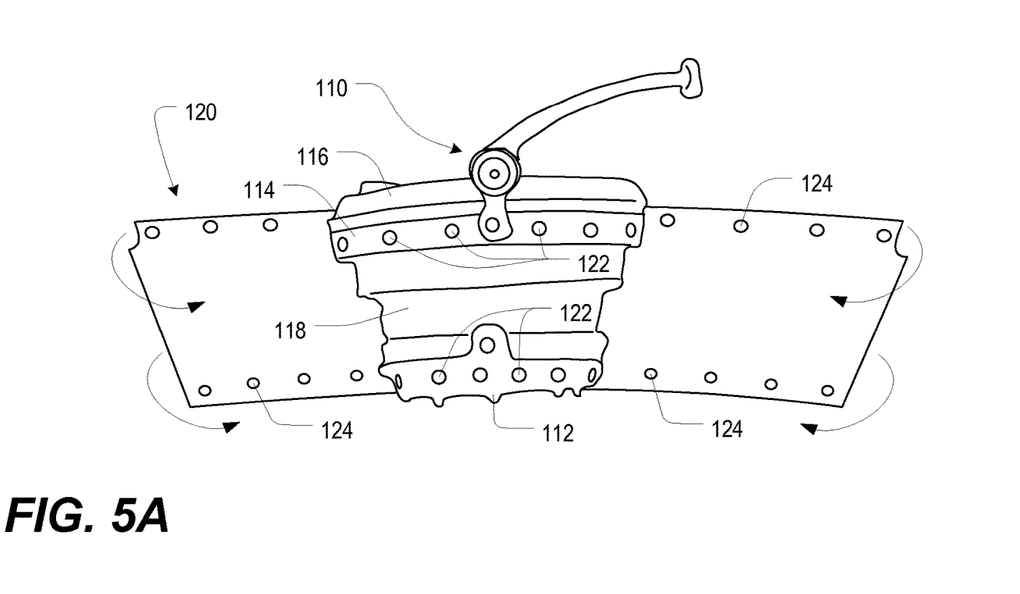
FIG. 5A is a side view of a preferred embodiment of a cylindrical cooler with wrap-around cover in accordance with one or more aspects of the present invention.
Figure 5B:
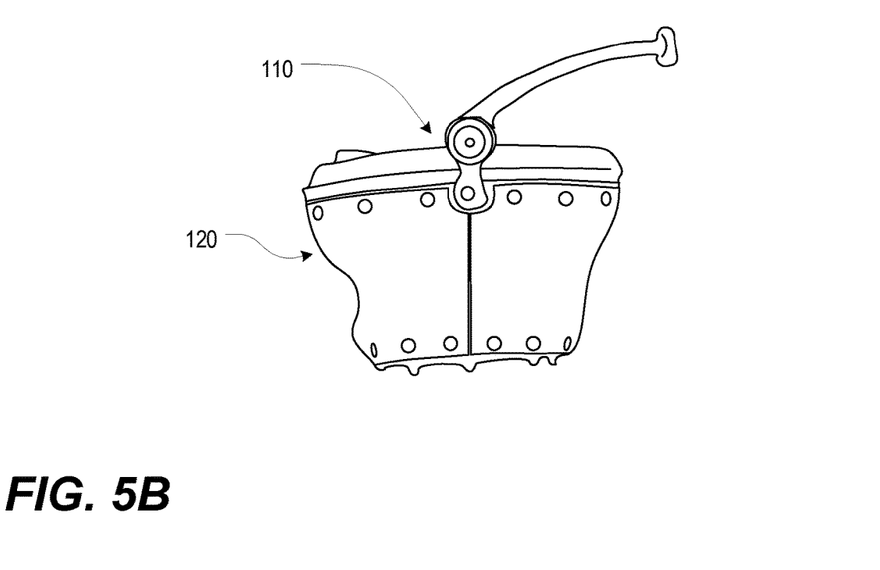
FIG. 5B is a side view of the cylindrical cooler with wrap-around cover of FIG. 5A.

FIGS. 5A and 5B are side views of a preferred embodiment of a cylindrical cooler 110 with a wrap-around side cover 120 in accordance with one or more aspects of the present invention. As illustrated in FIGS. 5A and 5B, the cooler 110 comprises a base 112, an upper rim 114, a lid 116, and a cooler wall 118 extending between the base 112 and the upper rim 114. The base 112 and the upper rim 114 include a plurality of male snap connectors 122 adapted to mate with female snap connectors 124 on the wrap-around side cover 120. Although the cooler 110 and wrap-around side cover 120 are shown with snap connectors 122,124, alternative contemplated embodiments include other types of connectors to attach the wrap-around cover to the cooler.

Similar to the wrap-around side cover 20, in one or more preferred embodiments, the wrap-around side cover 120 is constructed from a flexible, elastic, moisture-absorbent material, such as neoprene, polychloroprene, or other synthetic rubber materials.

Further shown in FIGS. 5A and 5B is the process of attaching the wrap-around side cover 120 to the cooler 110. The wrap-around side cover 120 is positioned around the cooler wall 118, as seen in FIG. 5A. Next, the female snap connectors 124 on the wrap-around side cover 120 are aligned with, and attached to, the male snap connectors 122 on the base 112 and upper rim 114, as illustrated in FIG. 5B.

Figure 6A:
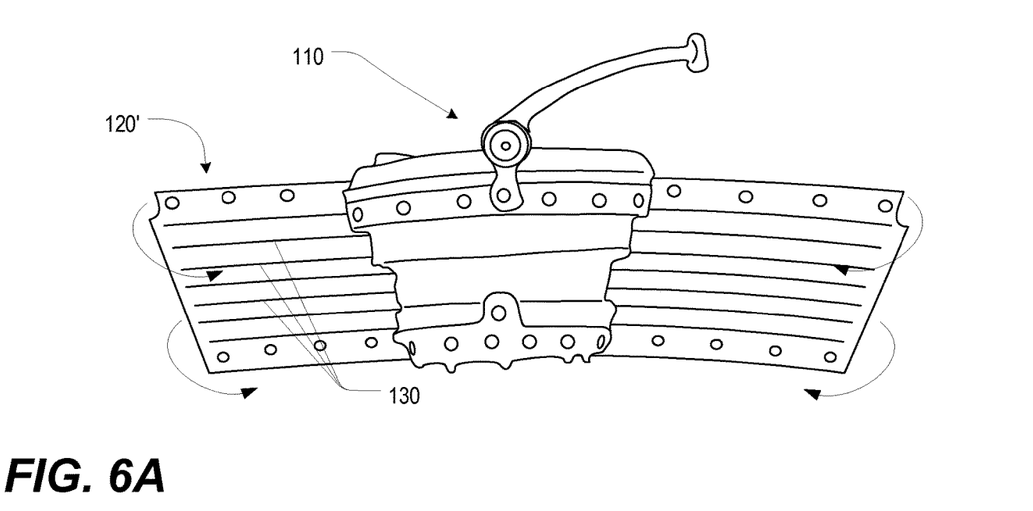
FIGS. 6A and 6B are side views of the cooler of FIGS. 5A and 5B with a snug-fit wrap-around cover in accordance with one or more aspects of the present invention.
Figure 6B:
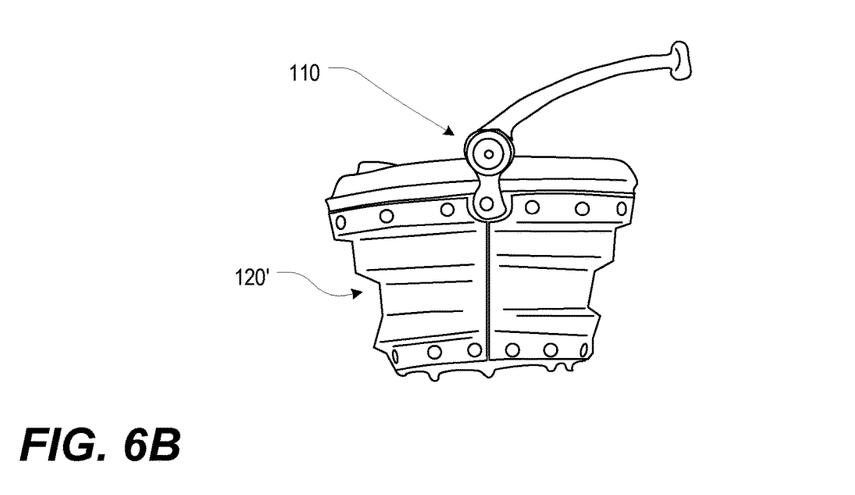

FIGS. 6A and 6B are side views of the cooler 110 of FIGS. 5A and 5B with a snug-fit wrap-around side cover 120' in accordance with one or more aspects of the present invention. The snug-fit wrap-around side cover 120' resembles the wrap-around side cover 120; however, the snug-fit wrap-around side cover 120' is adapted to fit more snuggly around the cooler wall 118. In one or more preferred embodiments, the snug-fit wrap-around side cover 120' includes one or more hinge lines 130. The hinge lines 130 are thinner, and thus more flexible and more deformable, than other portions of the snug-fit wrap-around cover 120'.

Further illustrated by FIGS. 6A and 6B is the process of attaching the snug-fit wrap-around side cover 120' to the cooler 110. The snug-fit wrap-around side cover 120' is positioned around the cooler wall 118, as seen in FIG. 6A. Next, the female snap connectors 124 on the snug-fit wrap-around side cover 120' are aligned with, and attached to, the male snap connectors 122 on the base 112 and upper rim 114, as illustrated in FIG. 6B.

Figure 7:
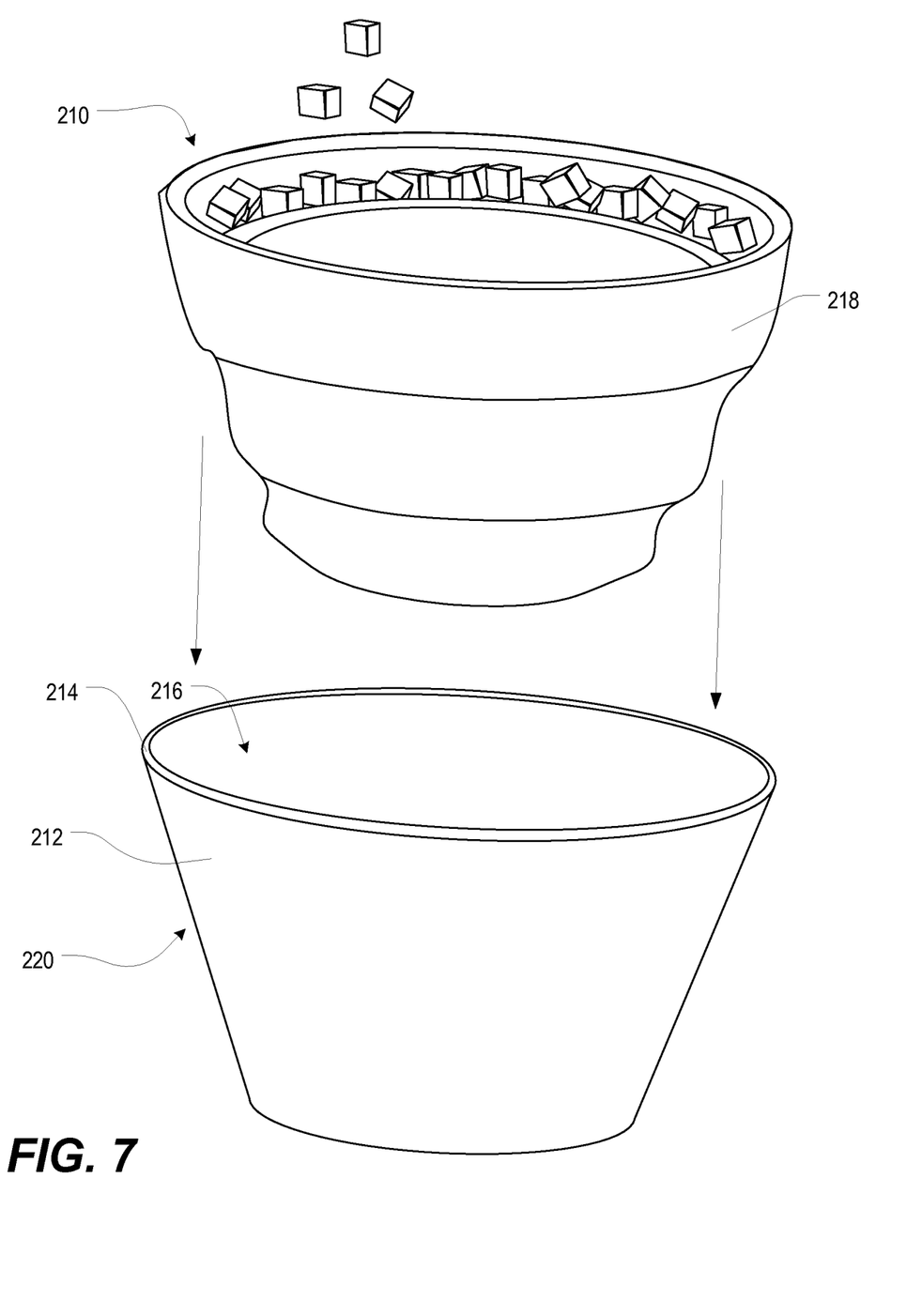
FIG. 7 is a front perspective view of a preferred embodiment of a cooler with a drop-in cover in accordance with one or more aspects of the present invention.

FIG. 7 is a front perspective view of a preferred embodiment of a cooler 210 with a slide-on cover 220 in accordance with one or more aspects of the present invention. The slide-on cover includes a base, a wall 212, and a rim 214 along the top of the wall 212 defining a cooler opening 216. In one or more preferred embodiments, the slide-on cover 220 is constructed from a flexible, elastic, moisture-absorbent material, such as neoprene, polychloroprene, or other synthetic rubber materials. To use the slide-on cover 220, the cooler 210 is simply inserted into the cooler opening 216 such that the slide-on cover 220 substantially surrounds the cooler wall 218.

Figure 8:
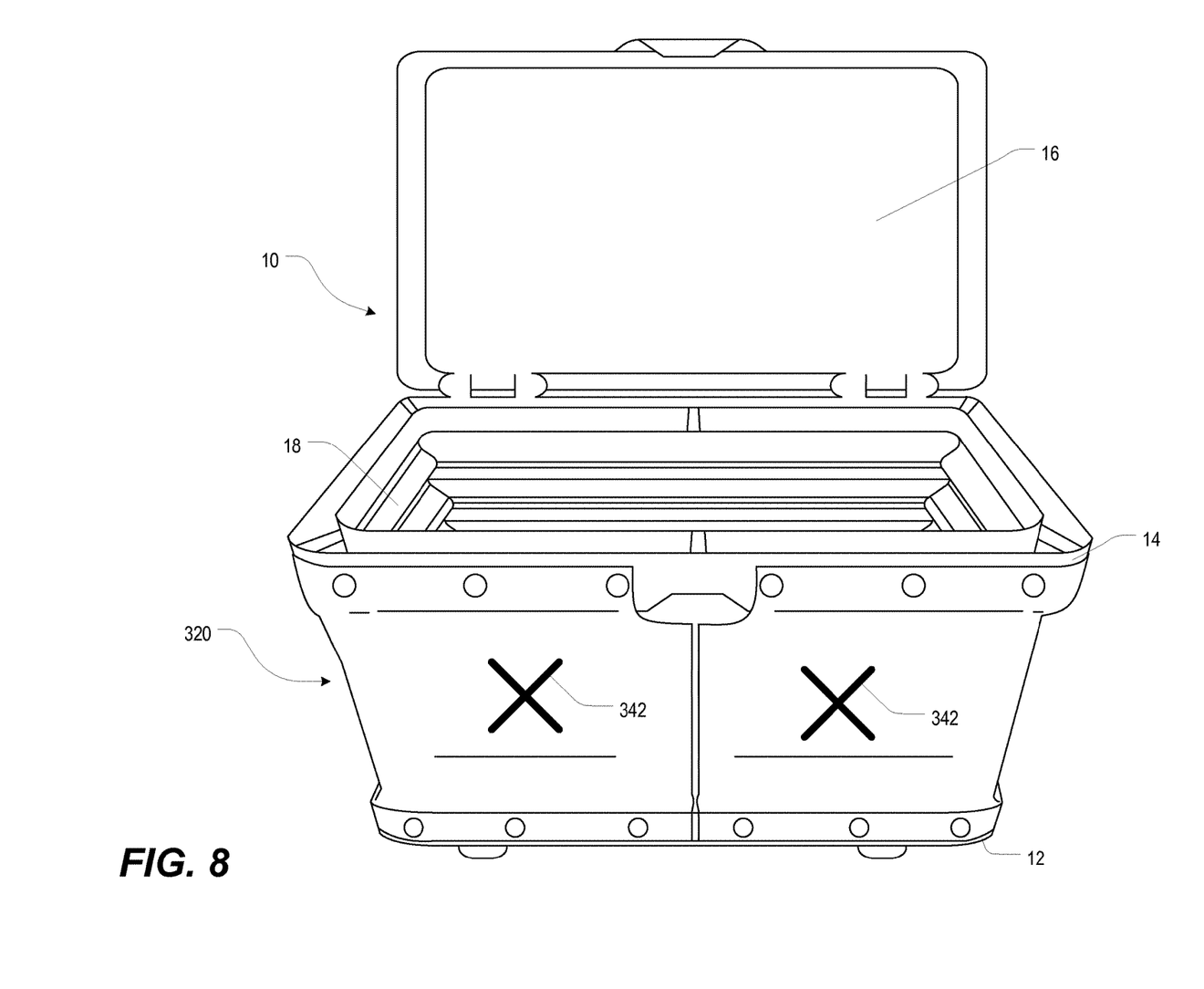
FIG. 8 is a front perspective view of a wrap-around side cover which includes decorative symbols.

In one or more preferred implementations, a cover includes one or more decorative images, logos, or symbols, and/or text. For example, FIG. 8 illustrates the cooler of FIG. 1 with a cover 320 having decorative images 342. In one or more preferred implementations, decorative images, logos, symbols, or text is painted, sewn, stitched, or imprinted. In one or more preferred implementations, a sticker or panel including a decorative image, logo, symbol, or text is secured to a cover. In some preferred implementations, a decorative image, logo, symbol, or text associated with a college, university, team, or sporting event is utilized.

In one or more preferred commercial implementations, a cover is configured to allow one or more panels including one or more images, logos, symbols, and/or text to be removably secured to the cover. In this way, multiple interchangeable panels including different images, logos, symbols, and text can alternately be utilized with a single cover. In some preferred implementations, such removable securement is facilitated by snap connectors, adhesive, straps, Velcro, or other known fastening or securement methods.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A cooler comprising:
   (a) a cooler body including one or more cooler walls extending between a base of the cooler body and an upper rim of the cooler body; and
   (b) a cover configured to be disposed around an exterior of the cooler body, the cover being sized and dimensioned to generally cover an exterior of the one or more cooler walls of the cooler body;
   (c) wherein the cover is releasably secured by fasteners directly to both the base of the cooler body and to the upper rim of the cooler body and extends therebetween in covering relation to the exterior of the one or more cooler walls.

2. The cooler of claim 1, wherein at least some of the fasteners each comprises a first component secured to the cover and a second component secured to the base of the cooler body, wherein the first component and the second component of each fastener releasably attach together in securing the cover.

3. The cooler of claim 1, wherein at least some of the fasteners each comprises a first component secured to the cover and a second component secured to the upper rim of the cooler body, wherein the first component and the second component of each fastener releasably attach together in securing the cover.

4. The cooler of claim 1, wherein the fasteners comprise a first plurality of fasteners each comprising a first component secured to the cover and a second component secured to the base of the cooler body, and a second plurality of fasteners each comprising a first component secured to the cover and a second component secured to the upper rim of the cooler body.

5. The cooler of claim 1, wherein each fastener comprises two components consisting of a male component and a female component configured to releasable engage with the male component, with one of the two components being secured to the cover and the other of the two components being secured to the base or the upper rim of the cooler body.

6. The cooler of claim 5, wherein the fasteners comprise snap connector.

7. The cooler of claim 1, wherein the cover is not secured by fasteners directly to the cooler wall.

8. The cooler of claim 1, wherein the cover is secured to the base and the upper rim of the cooler body via snap connectors.

9. The cooler of claim 1, wherein the cooler further includes a lid.

10. The cooler of claim 1, wherein the cover includes an image, logo, symbol, or text.

11. The cooler of claim 1, wherein a panel includes the image, logo, symbol, or text, and wherein the panel is removably attachable to the cover.

12. The cooler of claim 1, wherein
   (a) the one or more cooler walls of the cooler body include one or more hinge lines configured to allow the cooler body to transition between an expanded configuration and a collapsed configuration;
   (b) the cover includes one or more hinge lines configured to allow the cover to collapse; and
   (c) the cooler body and the cover are configured such that, even when the cover is secured both to the base and to the upper rim around the cooler body, the cooler body can transition between its expanded configuration and its collapsed configuration.

13. The cooler of claim 1, wherein the cover is releasably secured both to the rim at attachment locations that are disposed at intervals along the rim around the periphery of the cooler, and to the base at attachment locations that are disposed at intervals along the base around the periphery of the cooler.

14. The cooler of claim 1, wherein the cover is releasably secured via snap connectors located at intervals around the periphery of the cooler both along the rim and along the base.

15. A method for handling sweating at a cooler, the method comprising:
   (a) disposing a cover about one or more exterior walls of the cooler that extend from a base of the cooler to an upper rim of the cooler; and
   (b) releasably securing the cover to the cooler by fastening the cover to the base of the cooler and to the upper rim of the cooler, with the cover extending therebetween in covering relation to the one or more exterior walls of the cooler;
   (c) wherein the cover comprises a moisture-absorbent material.

16. The method of claim 15, wherein the cover includes an image, logo, symbol, or text.

17. The method of claim 15, wherein a panel includes the image, logo, symbol, or text, and wherein the panel is removably attachable to the cover.

18. A cooler, comprising:
   (a) a cooler body including a rim defining an upper portion of the cooler and a base defining a lower portion of the cooler, and one or more cooler walls extending between the rim and the base; and
   (b) a wrap-around side cover disposed around a peripheral side exterior of the cooler body, the cover generally covering the peripheral side exterior of the one or more cooler walls of the cooler body in close relation thereto;
   (c) wherein the wrap-around side cover is releasably secured by fasteners directly to both the rim and the base around the periphery of the cooler.

19. The cooler of claim 18, wherein the wrap-around side cover is not secured by fastener directly to any of the one or more cooler walls.

20. The cooler of claim 18, wherein the fasteners comprise snap connectors.

* * * * *